United States Patent
Short

(10) Patent No.: US 6,453,885 B1
(45) Date of Patent: Sep. 24, 2002

(54) VAPOR REMOVAL FUEL CONTAINMENT FUEL TANK

(75) Inventor: William Thomas Short, Southfield, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/653,179

(22) Filed: Aug. 31, 2000

Related U.S. Application Data

(60) Provisional application No. 60/172,564, filed on Dec. 18, 1999.

(51) Int. Cl.[7] ............................................. F02M 33/02
(52) U.S. Cl. ............................................. 123/518; 123/516
(58) Field of Search .................... 123/516, 518, 123/520; 220/4.14, 905, 723

(56) References Cited

U.S. PATENT DOCUMENTS

| | | | | |
|---|---|---|---|---|
| 3,561,414 A | * | 2/1971 | Schou | 123/518 |
| 3,701,540 A | * | 10/1972 | Pringle | 280/834 |
| 3,772,071 A | * | 11/1973 | Harr | 427/115 |
| 3,787,279 A | * | 1/1974 | Winchester | 205/310 |
| 3,977,379 A | * | 8/1976 | Weissenbach | 123/518 |
| 4,123,582 A | * | 10/1978 | Musyt | 428/335 |
| 4,668,535 A | * | 5/1987 | Liggett et al. | 427/230 |
| 4,790,350 A | * | 12/1988 | Arnold | 137/588 |
| 5,056,493 A | * | 10/1991 | Holzer | 123/518 |
| 5,547,096 A | * | 8/1996 | Kleyn | 220/4.14 |
| 5,596,971 A | * | 1/1997 | Kidokoro | 123/516 |
| 5,722,374 A | * | 3/1998 | Kidokoro et al. | 123/516 |
| 5,746,186 A | * | 5/1998 | Kidokoro et al. | 123/516 |
| 5,979,417 A | * | 11/1999 | Hyodo et al. | 123/516 |
| 6,240,908 B1 | * | 6/2001 | Hyodo et al. | 123/516 |
| 6,260,544 B1 | * | 7/2001 | Spry et al. | 123/516 |

FOREIGN PATENT DOCUMENTS

| | | | | |
|---|---|---|---|---|
| DE | 3445427 A1 | * | 7/1985 | B60K/15/02 |
| FR | 2707916 | * | 1/1995 | B29C/63/02 |

* cited by examiner

*Primary Examiner*—Tony M. Argenbright
*Assistant Examiner*—Hai Huynh
(74) *Attorney, Agent, or Firm*—Vincent A. Cichosz

(57) ABSTRACT

A vapor removal fuel containment fuel tank for a vehicle includes a tank shell having a wall formed from a primary fuel containment layer. The fuel tank also includes a secondary fuel containment layer disposed adjacent the primary fuel containment layer to contain fuel therein. The fuel tank further includes a vapor removal system extending through the primary fuel containment layer to allow fuel vapors that build up between the primary fuel containment layer and secondary fuel containment layer to be removed from the fuel tank.

18 Claims, 1 Drawing Sheet

VAPOR REMOVAL FUEL CONTAINMENT FUEL TANK

CROSS-REFERENCE TO RELATED APPLICATION(S)

The present invention claims the priority date of U.S. Provisional Patent Application Ser. No. 60/172,564, filed Dec. 18, 1999, now abandoned.

TECHNICAL FIELD

The present invention relates generally to fuel tanks for vehicles and, more particularly, to a vapor removal fuel containment fuel tank of a vehicle.

BACKGROUND OF THE INVENTION

It is known to provide a fuel tank such as a plastic fuel tank in a vehicle to hold fuel to be used by an engine of the vehicle. Manufacturers of plastic fuel tanks are constantly striving to improve impact resistance and barrier properties of their fuel tanks without unduly increasing weight or cost. In plastic fuel tanks, the amount of organic emissions that diffuse through the tank wall is initially very small, but generally increases dramatically after a number of months as the wall materials become saturated with fuel, which can actually increase the wall susceptibility to permeation. However, there is concern that current plastic fuel tanks may have difficulty meeting expected emissions standards.

In a standard plastic fuel tank, there is a continuous diffusion gradient of fuel across the layers of the walls of the fuel tank that actually decrease the effectiveness of the wall as a permeation barrier. If this gradient is interrupted, and the permeates removed before reaching the outer layers of the fuel tank, the emissions can be virtually eliminated.

One commercial approach to resolve this concern is to thicken the wall and/or barrier layers of the fuel tank, which increases the weight, cost and reduces fuel capacity of the fuel tank. Another commercial approach is to protect the fuel tank by metal sheets or shields, which increases the weight and cost of the plastic fuel tank. Yet another commercial approach is to add multiple barrier materials, which add weight and cost.

Therefore, it is desirable to provide a fuel tank for a vehicle that has improved anti-permeation properties without substantially increasing thickness of the tank wall. It is also desirable to provide a vapor removal system for a fuel tank of a vehicle that significantly reduces fuel permeation without unduly increasing weight, complexity, and cost of the fuel tank.

SUMMARY OF THE INVENTION

It is, therefore, one object of the present invention to provide a new vapor removal system for a containment fuel tank for a vehicle.

It is another object of the present invention to provide a dual walled plastic fuel tank with an inner fuel containment liner and a vapor purge and recovery system.

To achieve the foregoing objects, the present invention is a vapor removal fuel containment fuel tank for a vehicle including a tank shell having a wall formed from a primary fuel containment layer. The fuel tank also includes a secondary fuel containment layer disposed adjacent the primary fuel containment layer to contain fuel therein. The fuel tank further includes a vapor removal system extending through the primary fuel containment layer to allow fuel vapors that build up between the primary fuel containment layer and secondary fuel containment layer to be removed from the fuel tank.

One advantage of the present invention is that a vapor removal fuel containment fuel tank is provided for a vehicle that has improved integrity during a vehicle impact, improved resistance to fuel permeation, and reduced cost. Another advantage of the present invention is that the vapor removal fuel containment fuel tank has an inner fuel containment liner and an active purge between the layers, virtually eliminating the fuel gradient in the outer wall since the concentrations at the inner surface are kept very low, hence, virtually zero tank emissions from the walls or seams. Yet another advantage of the present invention is that the vapor removal fuel containment fuel tank avoids the use of additional barrier layers that add significant cost and weight and eliminates polymeric tie-layers, removing expensive materials from the fuel tank. Still another advantage of the present invention is that the vapor removal fuel containment fuel tank is relatively easy to adapt for a thermofoming process for manufacturing the fuel tank.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
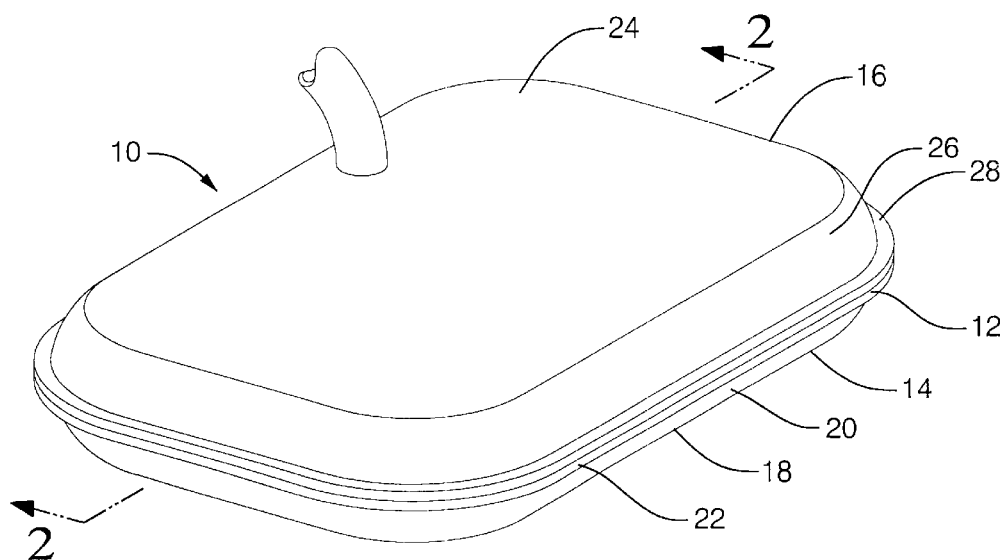
FIG. 1 is a perspective view of a vapor removal fuel containment fuel tank, according to the present invention.
Figure 2:
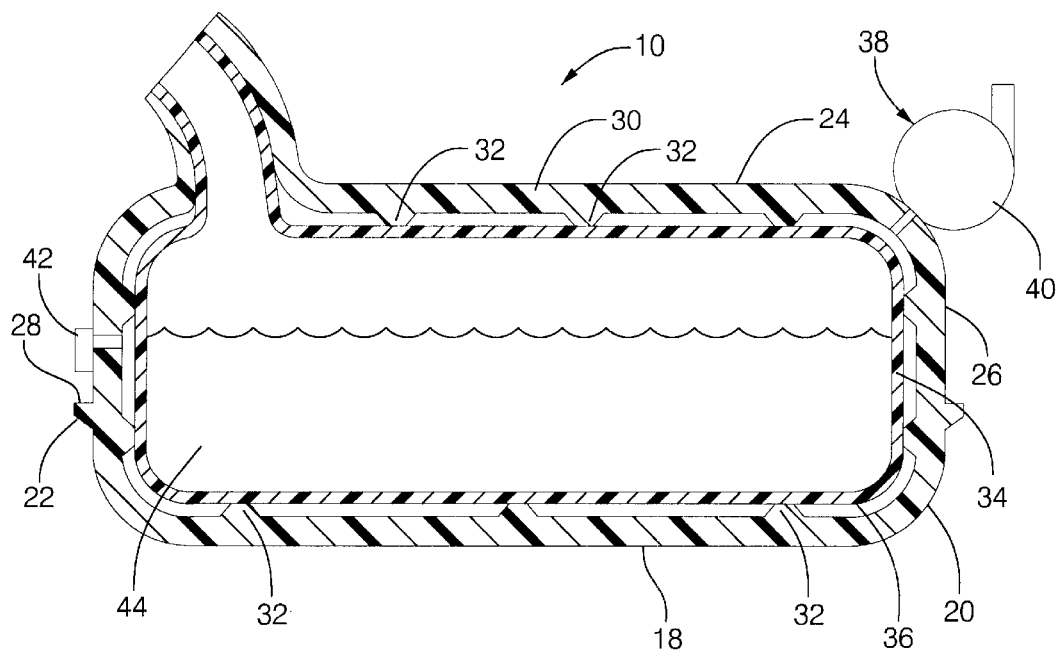
FIG. 2 is an enlarged sectional view of the vapor removal fuel containment fuel tank of FIG. 1.

Referring to the drawings and in particular FIGS. 1 and 2, one embodiment of a vapor removal fuel containment fuel tank 10, according to the present invention, is shown for a vehicle (not shown). The vapor removal fuel containment fuel tank 10 includes a tank shell 12. In this embodiment illustrated, the tank shell 12 is of a generally rectangular type. The tank shell 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together by suitable means to form a seam such as by thermoforming, compression molding or friction welding. The lower half shell 14 and upper half shell 16 are made of a rigid material such as a thermoformable plastic.

Referring to FIGS. 1 and 2, the fuel containment fuel tank 10 has the base walls 18,24, side walls 20,26, and flanges 22,28 formed from at least one primary fuel containment layer 30. The primary fuel containment layer or wall 30 is made from a tough, impact resistant thermoformable plastic material such as high-density polyethylene (HDPE) or polyolefin, which is a conventional material known in the art. The primary fuel containment layer 30 has a predetermined thickness of approximately two millimeters (2.00 mm) determined by the mechanical needs of the fuel tank 10. The primary fuel containment layer 30 has a plurality of separators 32 such as projections extending inwardly. The separators 32 extend from the base walls 18,25 and side walls 20,26. The separators 32 are spaced laterally from each other and disposed over most of the surface of the primary fuel containment layer 30. It should be appreciated that the separators 32 may be in the form of ridges, projections, or channels to allow circulation of air between the primary fuel containment layer 30 and a secondary fuel containment layer 34 to be described.

The vapor removal fuel containment fuel tank 10 also includes a secondary fuel containment liner or layer 34 disposed adjacent the separators 32 of the primary fuel containment layer 30 to form an air space or gap 36 therebetween. The secondary fuel containment layer 34 is made from a tough, durable, and elastic material such as polyurethane or a fluorinated elastomer, which is highly resistant to rupture or puncture. The secondary fuel containment layer 30 has a predetermined thickness of approximately 2.5 mm. It should be appreciated that the elastic material has good resistance to permeation by the fuel.

The vapor removal fuel containment fuel tank 10 further includes a vapor removal system, generally indicated at 38, to allow any vapors that build up between the layers 30 and 34 to be removed and vented to a vapor recovery system (not shown) of the vehicle for subsequent elimination. The vapor removal system 38 includes a purge pump 40 having one end extending through the primary fuel containment layer 30 and communicating with the air gap 36 and the other end connected to and communicating with the vapor recovery system. The purge pump 40 is connected to a source of power such as an electronic control unit (ECU) (not shown) to periodically pump or flush the air gap 36. The vapor removal system 38 also includes a venting valve 42 extending through the primary fuel containment layer 30 and communicating with the air gap 36. The venting valve 42 is open to atmosphere to allow air to enter the air gap 36. It should be appreciated that the purge pump 40 and venting valve 42 are commercially available and known in the art.

In manufacturing the vapor removal fuel containment fuel tank 10, several conventional processes may be used. Preferably, the vapor removal fuel containment fuel tank 10 is formed by a conventional thermoforming process. The separators 32 can be molded directly into the inner surface of the primary fuel containment layer 30 or formed onto the outer surface of the secondary fuel containment layer 34. The primary fuel containment layer 30 and secondary fuel containment layer 34 are simultaneously co-extruded to form a fuel tank sheet which is vacuum formed into two shells that are fused together in a mold by conventional processes such as friction welding or heat sealing.

In operation, the vapor removal fuel containment fuel tank 10 contains fuel 44 as illustrated in FIG. 2. The secondary fuel containment layer 34 serves as the primary fuel permeation barrier for the fuel 44. The primary fuel containment layer 30 is optimized solely for its mechanical properties such as impact resistance. The vapor removal system 38 periodically flushes the air gap 36 to ensure that any fuel concentrations against the inner surface of the primary fuel containment layer 30 are so low that there is effectively no diffusion gradient across it, resulting in virtually zero tank emissions.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vapor removal fuel containment fuel tank for a vehicle comprising:
    a tank shell having a wall formed from a primary fuel containment layer;
    a secondary fuel containment layer disposed adjacent said primary fuel containment layer to contain fuel therein;
    a plurality of separators between said primary fuel containment layer and said secondary fuel containment layer to form an air gap therebetween to allow circulation of air between said primary fuel containment layer and said secondary fuel containment layer; and
    a vapor removal system extending through said primary fuel containment layer to allow fuel vapors that build up between said primary fuel containment layer and said secondary fuel containment layer to be removed from the fuel tank and vented to a vapor recovery system.

2. A vapor removal fuel containment fuel tank as set forth in claim 1 wherein said secondary fuel containment layer is made from an elastic material.

3. A vapor removal fuel containment fuel tank as set forth in claim 2 wherein said elastic material is either one of a polyurethane and fluorinated elastomer.

4. A vapor removal fuel containment fuel tank as set forth in claim 1 wherein said primary fuel containment layer is made from an impact resistant thermoformable plastic material.

5. A vapor removal fuel containment fuel tank as set forth in claim 4 wherein said impact resistant thermoformable plastic material is either one of a polyolefin material and a high-density polyethylene material.

6. A vapor removal fuel containment fuel tank as set forth in claim 1 wherein said separators comprise projections extending from an inner surface of said primary fuel containment layer.

7. A vapor removal fuel containment fuel tank as set forth in claim 1 wherein said separators comprise projections extending from an outer surface of said secondary fuel containment layer.

8. A vapor removal fuel containment fuel tank as set forth in claim 1 wherein said vapor removal system comprises a vent valve extending through said primary fuel containment layer and communicating with said air gap.

9. A vapor removal fuel containment fuel tank as set forth in claim 1 wherein said primary fuel containment layer and said secondary fuel containment layer are bonded together.

10. A vapor removal fuel containment fuel tank for a vehicle comprising:
    a tank shell having a wall formed from a primary fuel containment layer;
    a secondary fuel containment layer disposed adjacent said primary fuel containment layer to contain fuel therein;
    a vapor removal system extending through said primary fuel containment layer to allow fuel vapors that build up between said primary fuel containment layer and said secondary fuel containment layer to be removed from the fuel tank;
    a plurality of separators between said primary fuel containment layer and said secondary fuel containment layer to form an air gap therebetween; and
    wherein said vapor removal system comprises a purge pump having one end extending through said primary fuel containment layer and communicating with said air gap.

11. A vapor removal fuel containment fuel tank for a vehicle comprising:
- a tank shell having a wall formed from a primary fuel containment layer being made of an impact resistant thermoformable plastic material;
- a secondary fuel containment layer being made of an elastic material and disposed adjacent said primary fuel containment layer to contain fuel therein;
- a plurality of separators between said primary fuel containment layer and said secondary fuel containment layer to form an air gap therebetween to allow circulation of air between said primary fuel containment layer and said secondary fuel containment layer; and
- a vapor removal system extending through said primary fuel containment layer to allow fuel vapors that build up between said primary fuel containment layer and said secondary fuel containment layer to be removed from the fuel tank and vented to a vapor recovery system.

12. A vapor removal fuel containment fuel tank as set forth in claim 11 wherein said elastic material is either one of a polyurethane and fluorinated elastomer.

13. A vapor removal fuel containment fuel tank as set forth in claim 11 wherein said separators comprise projections extending from an inner surface of said primary fuel containment layer.

14. A vapor removal fuel containment fuel tank as set forth in claim 11 wherein said separators comprise projections extending from an outer surface of said secondary fuel containment layer.

15. A vapor removal fuel containment fuel tank as set forth in claim 11 wherein said vapor removal system comprises a vent valve extending through said primary fuel containment layer and communicating with said air gap.

16. A vapor removal fuel containment fuel tank as set forth in claim 11 wherein said primary fuel containment layer and said secondary fuel containment layer are bonded together.

17. A vapor removal fuel containment fuel tank for a vehicle comprising:
- a tank shell having a wall formed from a primary fuel containment layer being made of an impact resistant thermoformable plastic material;
- a secondary fuel containment layer being made of an elastic material and disposed adjacent said primary fuel containment layer to contain fuel therein;
- a vapor removal system extending through said primary fuel containment layer to allow fuel vapors that build up between said primary fuel containment layer and said secondary fuel containment layer to be removed from the fuel tank;
- a plurality of separators between said primary fuel containment layer and said secondary fuel containment layer to form an air gap therebetween; and
- wherein said vapor removal system comprises a purge pump having one end extending through said primary fuel containment layer and communicating with said air gap.

18. A fuel tank for a vehicle comprising:
- a tank shell having a wall formed from a primary fuel containment layer being made of an impact resistant thermoformable plastic material;
- a secondary fuel containment layer being made of an elastic material and disposed adjacent said primary fuel containment layer to contain fuel therein; and
- a vapor removal system extending through said primary fuel containment layer to allow fuel vapors that build up between said primary fuel containment layer and said secondary fuel containment layer to be removed from the fuel tank, wherein said vapor removal system comprises a purge pump having one end extending through said primary fuel containment layer and communicating with said air gap and a vent valve extending through said primary fuel containment layer and communicating with said air gap.

* * * * *